(12) United States Patent
Yoon

(10) Patent No.: US 7,338,331 B2
(45) Date of Patent: Mar. 4, 2008

(54) POWER DISTRIBUTION PANEL

(75) Inventor: Jong-Chan Yoon, Busan (KR)

(73) Assignee: BMT Co., Ltd., Busan (KR)

( * ) Notice: Subject to any disclaimer, the term of this patent is extended or adjusted under 35 U.S.C. 154(b) by 0 days.

(21) Appl. No.: 11/659,536

(22) PCT Filed: Aug. 8, 2005

(86) PCT No.: PCT/KR2005/002577

§ 371 (c)(1),
(2), (4) Date: Feb. 6, 2007

(87) PCT Pub. No.: WO2006/025660

PCT Pub. Date: Mar. 9, 2006

(65) Prior Publication Data

US 2007/0254532 A1    Nov. 1, 2007

(30) Foreign Application Priority Data

Aug. 30, 2004   (KR) .................. 10-2004-0068427

(51) Int. Cl.
*H01R 9/22* (2006.01)
(52) U.S. Cl. ........................... 439/709; 439/723
(58) Field of Classification Search ........ 439/709–723; 361/600–674
See application file for complete search history.

(56) References Cited

U.S. PATENT DOCUMENTS

| 4,959,018 A * | 9/1990 | Yamamoto et al. ........ 439/76.1 |
| 5,466,974 A * | 11/1995 | Sutrina et al. .............. 361/623 |
| 6,086,415 A | 7/2000 | Sanchez et al. |
| 6,359,770 B1 * | 3/2002 | Kolody et al. .............. 361/626 |
| 6,431,880 B1 * | 8/2002 | Davis et al. ................ 439/76.2 |
| 6,442,017 B1 * | 8/2002 | Ewing et al. ............... 361/628 |
| 6,443,783 B1 * | 9/2002 | Beadle ........................ 439/718 |
| 6,753,754 B1 * | 6/2004 | Black et al. ................. 361/626 |
| 6,821,152 B2 * | 11/2004 | Van Dyke .................... 439/709 |
| 7,144,280 B2 * | 12/2006 | Cabrera et al. ............. 439/709 |
| 7,223,129 B1 * | 5/2007 | Lopez et al. ................ 439/709 |
| 2006/0128230 A1 * | 6/2006 | Korczynski et al. ........ 439/723 |

FOREIGN PATENT DOCUMENTS

JP          2000-013929 A    1/2000

* cited by examiner

*Primary Examiner*—Briggitte R. Hammond
(74) *Attorney, Agent, or Firm*—Birch, Stewart, Kolasch & Birch, LLP

(57) ABSTRACT

The present invention relates to a power distribution panel in which a plurality of loads is connected to an incoming power source. The power distribution panel comprises an input terminal connecting with an incoming power line; a common line extending from the input terminal; a plurality of introduction lines furcating from the common line in parallel; connecting means connecting with different load sides, such as a circuit breaker; and a terminal body comprising a central slot in which the common line is built, a plurality of side slots in which the respective introduction lines are built, an insulation block projectingly formed on the sides of the terminal body, and an identification block for identifying the output terminals of unit source out of the plurality of parallel-connected output terminals. According to the present invention, the input power can be distributed to the load sides conveniently, and a user can flexibly design the electrical stability, if necessary.

3 Claims, 5 Drawing Sheets

POWER DISTRIBUTION PANEL

TECHNICAL FIELD

The present invention relates to a power distribution panel, and more particularly to such a power distribution panel which comprises an input terminal including a tapped hole, a screw engaged with the tapped hole, and a washer, so as to connect with an incoming power line; a common line extending from the input terminal; a plurality of introduction lines furcating from the common line in parallel; connecting means including a plurality of output terminals which form end points of the introduction lines so as to connect with different load sides, such as a circuit breaker; and a terminal body comprising a central slot in which the common line is built; a plurality of side slots in which the respective introduction lines are built; an insulation block projectingly formed on the sides of the terminal body, so that it guides the introduction lines to the output terminals and insulates the respective introduction lines; and an identification block for identifying the output terminals of unit source out of the plurality of parallel-connected output terminals, the width of the identification block being different from that of the insulation blocks.

BACKGROUND ART

In general, a power distribution panel, whose input terminal, distribution lines, and output terminals are exposed to the exterior, is connected to a stabilizer or a circuit breaker. Thus, the conventional panel has disadvantages in that the installation cost is increased, it is exposed to danger of accidents, and it cannot be flexibly operated in the factory facilities because the output control of the load sides is fixed individually.

That is, even when it is unnecessary to mount a stabilizer or circuit breaker in the load sides, the stabilizer or circuit breaker must be connected thereto, thus causing the unnecessary cost of equipment to unavoidably increase.

In addition, since the power source must be connected to the stabilizer or circuit breaker, the input power cannot be distributed to the load sides conveniently.

Additionally, a single stabilizer or circuit breaker cannot control the input and output of the whole load sides, and further a user cannot flexibly design the electrical stability for the load sides, if necessary.

DISCLOSURE OF INVENTION

Technical Problem

Therefore, the present invention has been made to solve the above-mentioned problems occurring in the conventional power distribution panel, and an object of the present invention is to provide a power distribution panel for distributing the input power to the load sides conveniently.

Another object of the present invention is to provide a power distribution panel in which a single stabilizer or circuit breaker can control the input and output of the whole load sides.

Another object of the present invention is to provide a power distribution panel which allows a user to flexibly design the electrical stability for the load sides, if necessary.

Technical Solution

To achieve the above objects, according to the present invention, there is provided a power distribution panel, which comprises an input terminal including a tapped hole, a screw engaged with the tapped hole, and a washer, so as to connect with an incoming power line; a common line extending from the input terminal, and a plurality of introduction lines furcating from the common line in parallel; connecting means including a plurality of output terminals which form end points of the introduction lines so as to connect with different load sides, such as a circuit breaker; and a terminal body comprising a central slot in which the common line is built; a plurality of side slots in which the respective introduction lines are built; an insulation block projectingly formed on the sides of the terminal body, so that it guides the introduction lines to the output terminals and insulates the respective introduction lines; and an identification block for identifying the output terminals of unit source out of the plurality of parallel-connected output terminals, the width of the identification block being different from that of the insulation blocks.

As another preferred embodiment, there is provided a power distribution panel, in which the respective output terminals of the connecting means, comprises a tapped hole, a screw engaged with the tapped hole, and a washer.

As yet another preferred embodiment, there is provided a power distribution panel, in which the respective output terminals of the connecting means, comprises a socket in which a wire for load side is inserted, and a tightening member including a screw for tightening the wire inserted in the socket.

Advantageous Effects

As mentioned above, since the present invention has an input terminal to which the incoming power source is connected, and a plurality of output terminals for distributing the power to the load sides, convenient power distribution from the source to the load sides can be accomplished.

In addition, since the stabilizer or circuit breaker of the incoming power is connected to the input terminal through the connecting means, the electrical stability of the incoming power can be secured; since the load sides are connected to the output terminals, the input and output of the whole load sides can be controlled by the stabilizer or circuit breaker connected to the input terminal.

In addition, since various stabilizers or circuit breakers are selectively connected to the respective output terminals, user can flexibly design the electrical stability, if necessary.

DESCRIPTION OF DRAWINGS

The above and other objects, features, and advantages of the present invention will become more apparent from the following description when taken in conjunction with the accompanying drawings, in which.

BEST MODE FOR INVENTION

Hereinafter, preferred embodiments of the present invention will be described in detail with reference to the attached drawings. In description, if the detailed description about the related prior arts and construction thereof is considered that it confuses the subject matter of the invention, the description will be omitted. The following terminologies are defined by considering the functions in the present invention, which are subject to change in accordance with the intention of users or operators, or the conventions. Therefore, the definition of the terminologies should be construed based upon the whole contents of the specification describing a power distribution panel.

Figure 1:
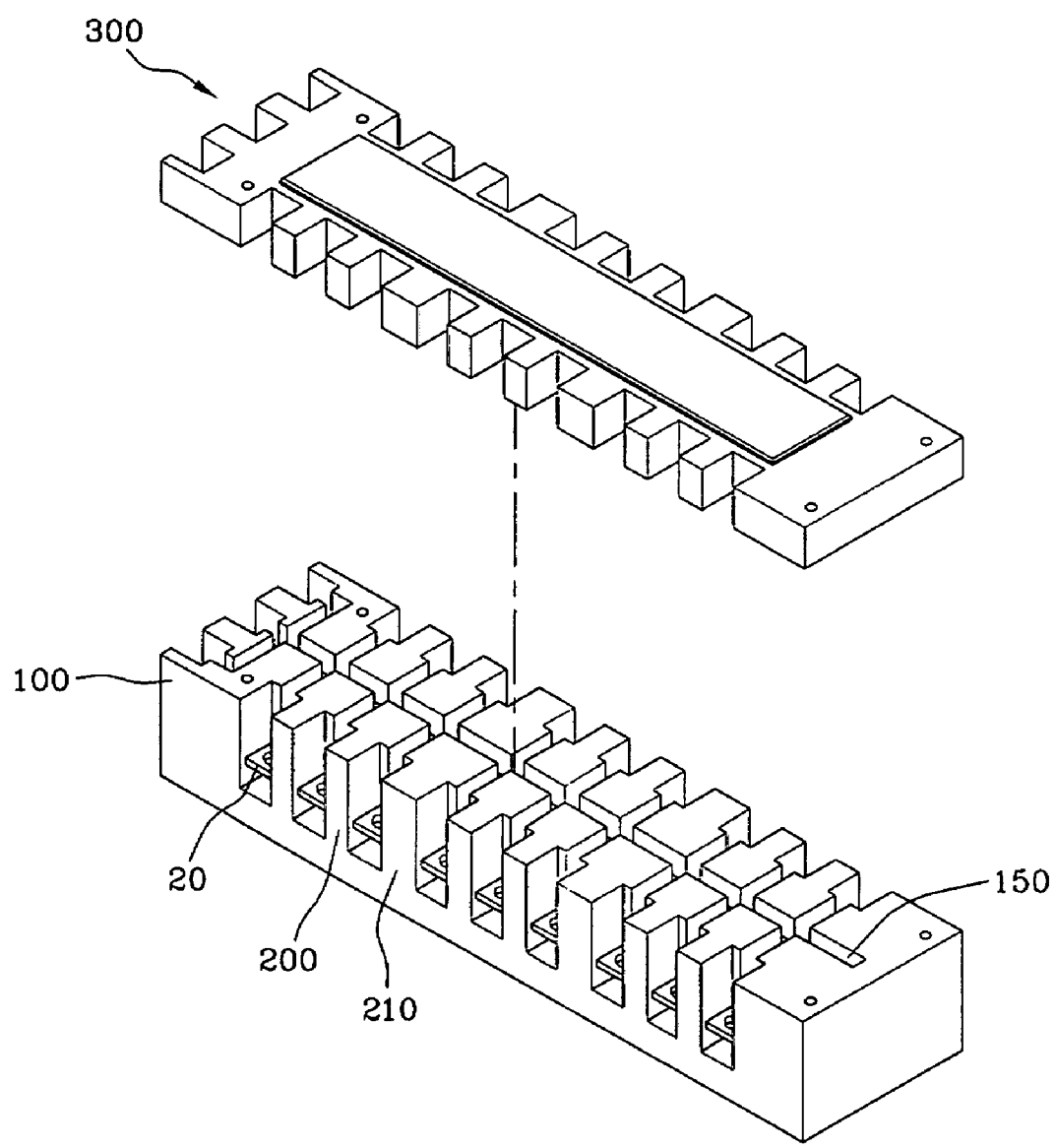
FIG. 1 is a schematic diagram of a power distribution panel according to one embodiment of the present invention.
Figure 2:
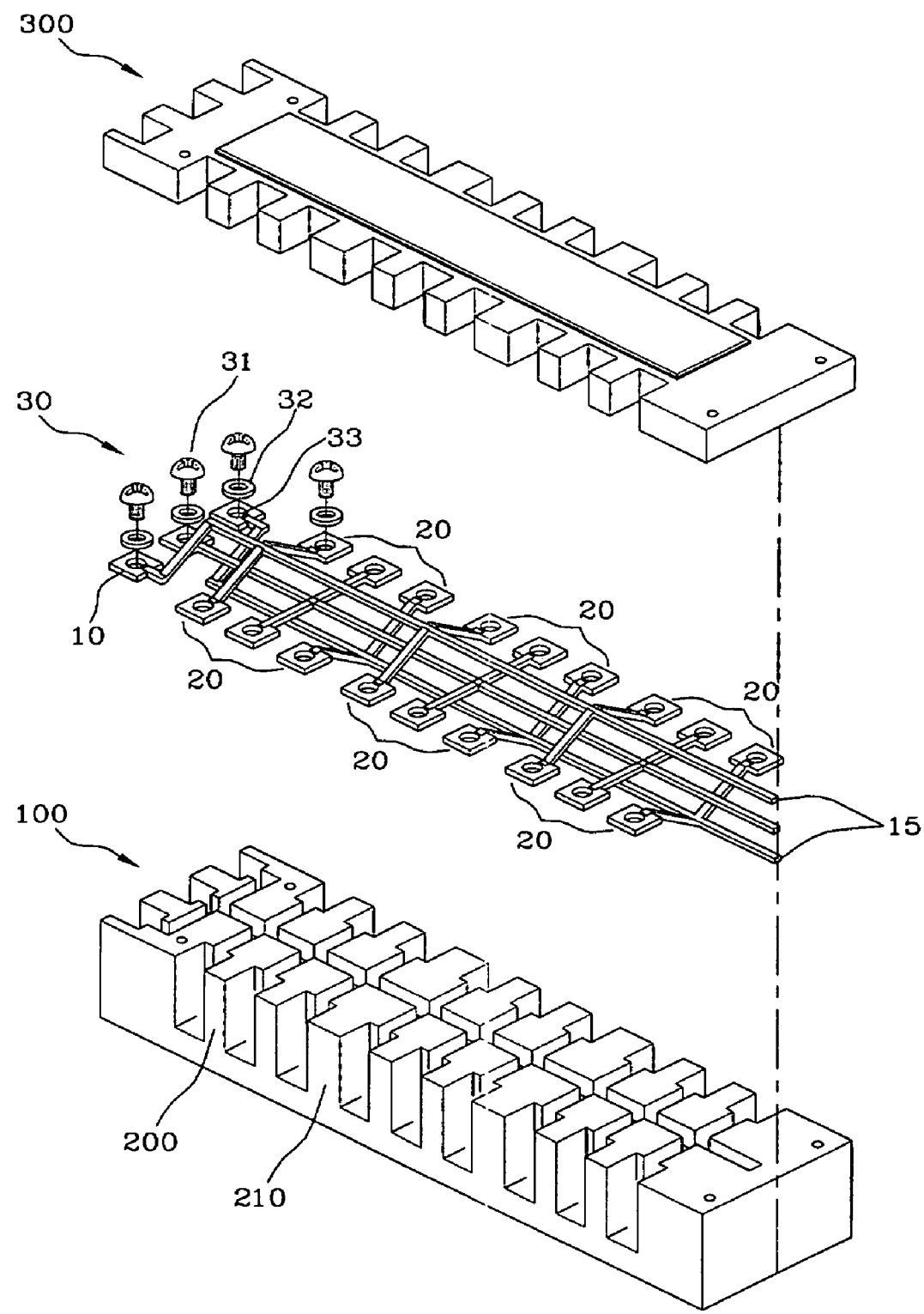
FIG. 2 is an exploded perspective view showing a power distribution panel according to one embodiment of the present invention.
Figure 3:
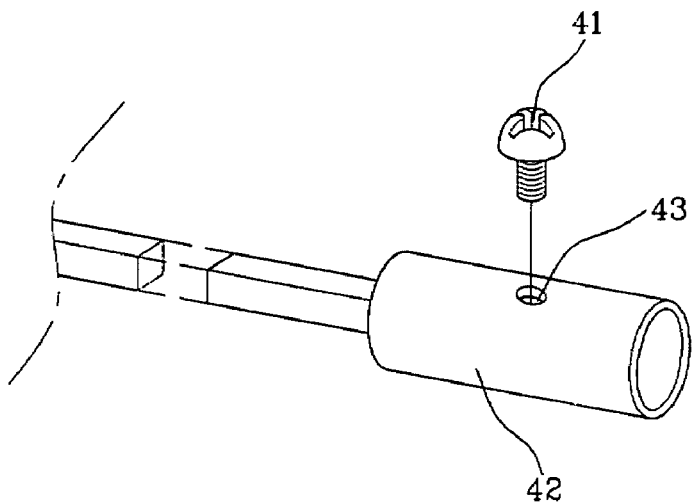
FIG. 3 is a schematic diagram of an output terminal of a power distribution panel according to another embodiment of the present invention.
Figure 4:
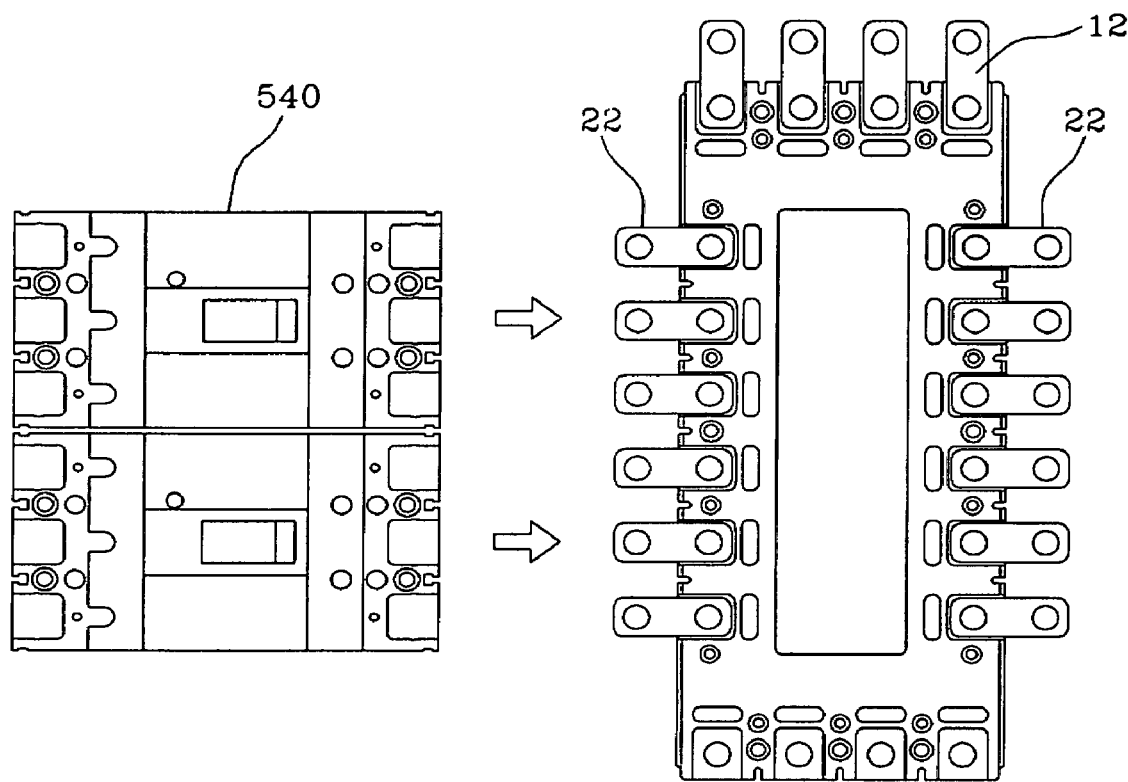
FIGS. 4 to 6 show various usage modes for a power distribution panel according to various embodiments of the present invention.
Figure 5:
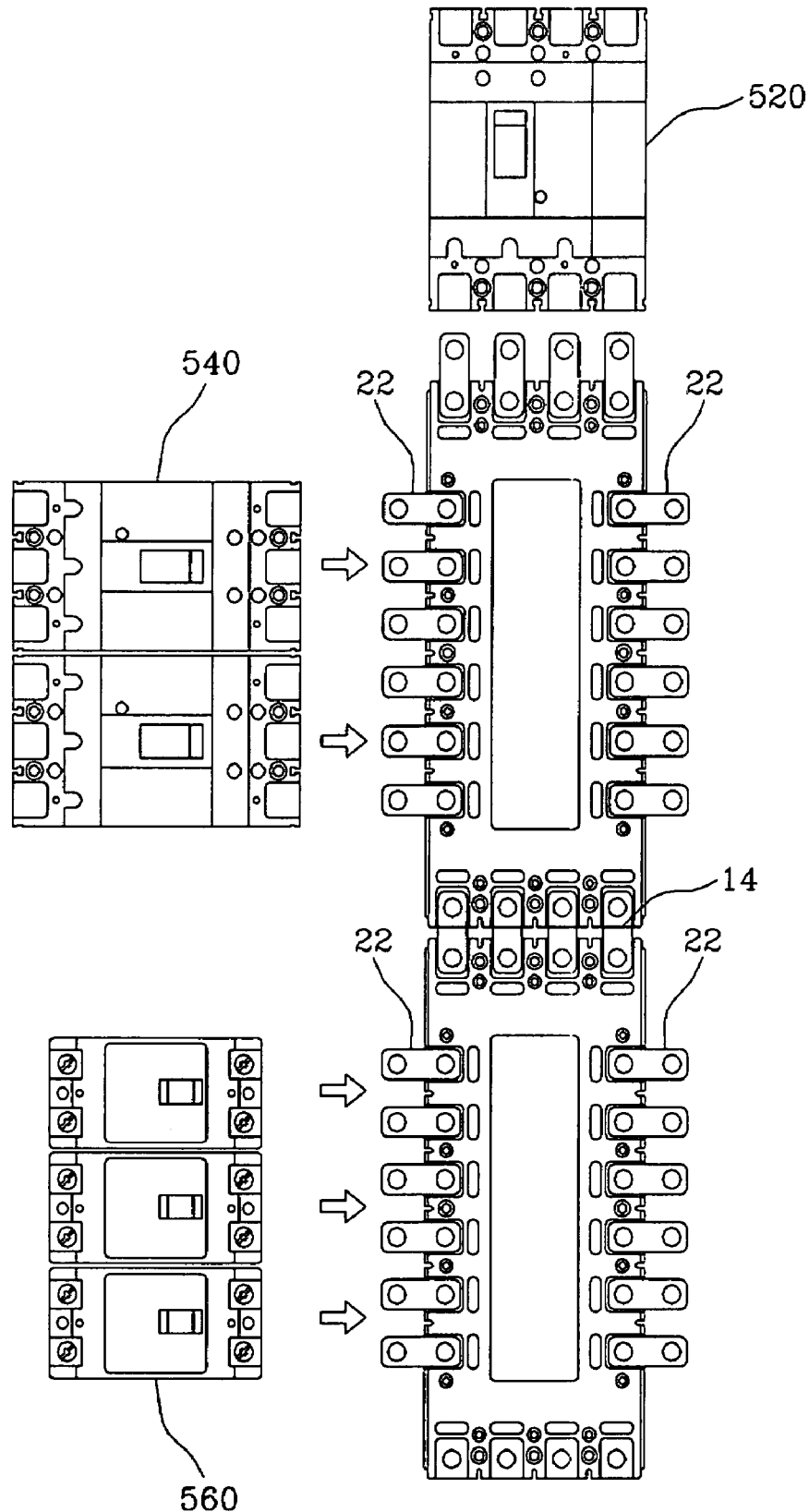
Figure 6:
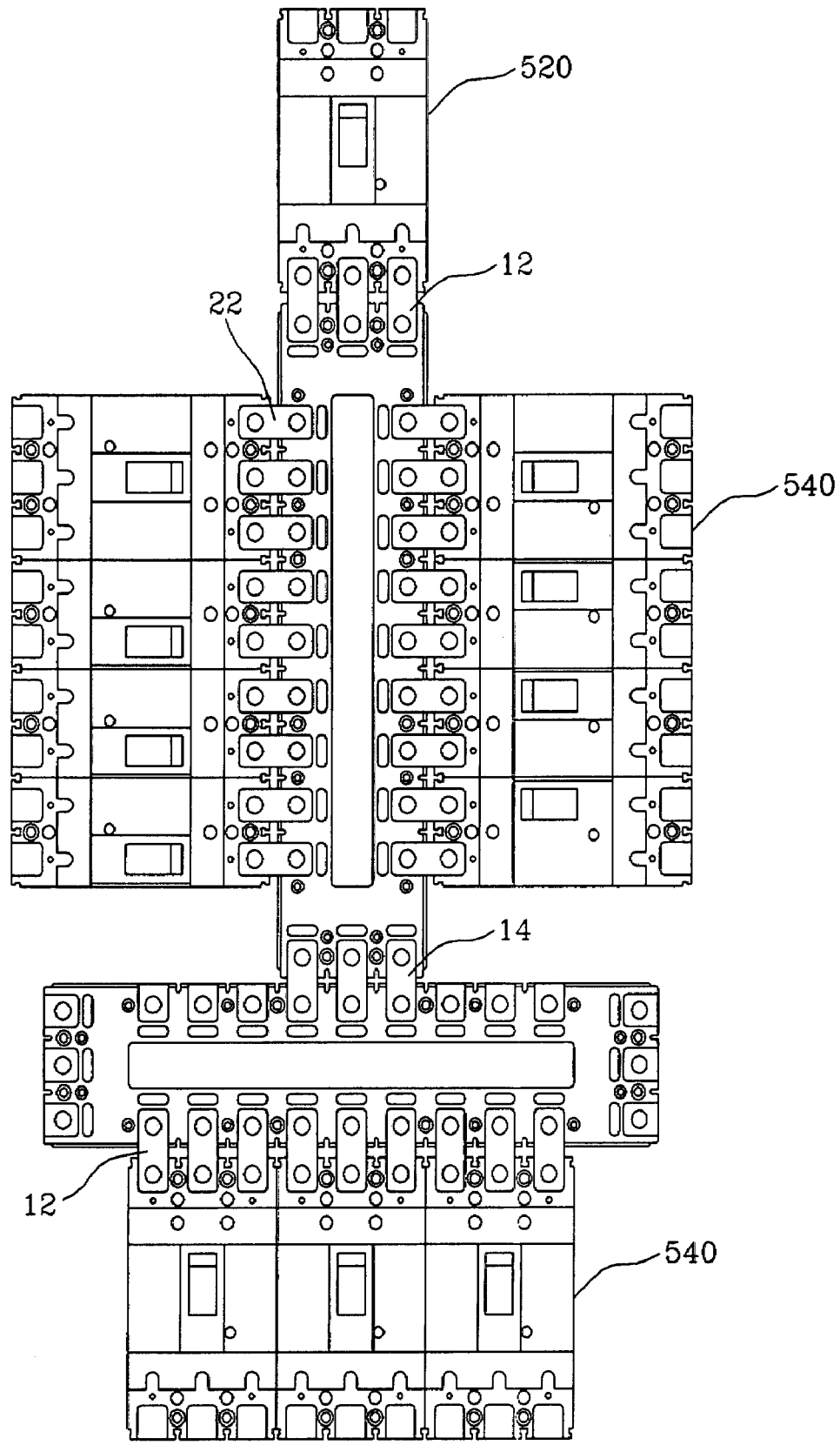

FIGS. 1 and 2 are respectively a schematic diagram and an exploded perspective view showing a power distribution panel according to one embodiment of the present invention, FIG. 3 is a schematic diagram of an output terminal of a power distribution panel according to another embodiment of the present invention, and FIGS. 4 to 6 respectively show various using modes for a power distribution panel according to various embodiments of the present invention.

As is shown in the drawings, a power distribution panel according to the present invention generally comprises an input and output terminal, and a terminal body 100. The input and output terminal includes input terminals 10 and output terminals 20. The terminal body 100 includes a central slot 150, an insulation block 200, and an identification block 210.

The present invention provides a panel for easily distributing the input power to the load sides. To the input terminals 10 is inputted the incoming power through connecting means 30. In FIG. 2, there is shown a connecting means 30 which is composed of a tapped hole 33, a screw 31 engaged with the tapped hole 33, and a washer 32, so that the connecting means 30 can directly connect with the incoming power line.

The output terminals 20 are terminals connected to introduction lines furcating from a common line 15 extending from the input terminals 10, so that the terminals with the introduction lines are connected with the common line 15 in parallel. FIG. 2 exemplarily shows a most desirable embodiment, in which a plurality of output terminals 20 are located symmetrically on the left and right of the central common lines 15.

However, the present invention is not limited to the construction, but may include asymmetric structure that the output terminals are located at only either right or left side, with respect to the common lines 15.

For easier connection of wires for the load sides, it is preferable that the output terminals 20 also have connecting means, similar to the input terminals 10. As in FIG. 2, the connecting means for the output terminals 20 may comprise the tapped hole 33, the screw 31 engaged with the tapped hole 33, and the washer 32. Alternatively, as shown in FIG. 3, the connecting means for the output terminals 20 may comprise a socket 42 in which the wire for load side is inserted, and a tightening member such as a screw 41 for tightening the wire inserted in the socket 42. In FIG. 3, a reference numeral "43" denotes a tapped hole to which the screw 41 is engaged.

In the mean time, FIG. 2 shows common lines 15 which are vertically layered at a certain intervals. However, the present invention does not exclude the structure that the common lines 15 are disposed on the same level, for example.

The common lines 15 are built in the central slot 150 that is deeply formed at the center portion of the terminal body 100.

More in detail, since the incoming power source is commonly a three-phase source having three power lines per unit input, the three lines are insulatively built in the central slot 150, in a stacked fashion.

As shown in FIG. 2, the insulation blocks 200 are formed symmetrically at the right and left sides of the terminal body 100. The lower portions of the insulation blocks 200 are integrally formed with one another so as to form the insulation blocks 200.

Alternatively, the insulation block 200 may be constructed so that an upper part and a lower part of the terminal body 100 can be open, the terminal body 100 having projections formed on the both sides symmetrically.

The insulation blocks 200 guide the introduction lines furcating from the common line 15 to the output terminals 20, and form sidewalls for insulating the respective terminals and lines.

With the aid of the insulation blocks 200, the output terminals 20 can be secured in the sidewalls so as not to be exposed to the exterior, thereby electrical safety being achieved.

Meanwhile, the identification block 210 is a block selected from the insulation blocks 200, but the width of the identification block 210 is different from that of the insulation block 200. The identification block 210 plays a role of identifier to easily distinguish the output terminals 20 of every unit sources, because the unit source has multiple phases, that is, for example, 3-phase source has three lines.

A reference numeral "300" denotes a terminal cover.

The structure of the terminal cover 300 and the terminal body 100 including the central slot 150, the insulation block 200, and the identification block 210, is for securing the vertically stacked common lines and the symmetrically right and left furcating output terminals. Therefore, in the case the common lines are built in on the same level or in the case the output terminals furcate asymmetrically, the terminal body has to be newly designed accordingly.

In constructing the connecting means of the input and output terminals, various modification can be adapted without being limited to the aforementioned construction.

Referring to FIGS. 4 and 5, it is possible that the terminals of the stabilizer or circuit breaker 520, 540, 560 are connected to the input terminal or output terminals of the power distribution panel through the medium of separate connectors 12, 22, the both ends of which are fastened to the terminals by using a screw and washer.

In addition, although not shown in the drawings, it is also possible that one end of the connector is integrally formed with the input or output terminals of the power distribution panel, so that the other end of the connector is drawn out of the terminal body, and the drawn end of the connector is connected to the input terminals of the stabilizer or circuit breaker by using a screw and washer.

In summary, the incoming power source is connected to the input terminal 10, and a plurality of output terminals 20 for distributing the power to the load sides are formed, thereby convenient power distribution from the source to the load sides is achieved.

Especially, according to the present invention, the electrical stability of the incoming power can be secured by connecting the stabilizer or circuit breaker of the incoming power to the input terminal through the connecting means or a connector, and the load sides are connected to the output terminals, thereby the input and output of the whole load sides can be controlled by the stabilizer or circuit breaker connected to the input terminal 10.

Alternatively, since various stabilizers or circuit breakers can be selectively connected to the respective output terminals 20, as occasion demands, through the connecting means or connectors, a user can flexibly design the electrical stability at need.

FIGS. 5 and 6 respectively show various usage modes for a power distribution panel according to various embodiments of the present invent. In order to control the input power and output power simultaneously, a circuit breaker 520 is connected to the input terminal through the medium of the aforementioned connectors 12, and various circuit breakers 540, 560 are connected to the output terminals by using the connectors 22, for various purposes.

In addition, the power distribution panel according to the present invention can be utilized in a variety of forms, by appropriately changing and combining the positions of the input terminals and output terminals, in accordance with the usage of the panel or the type and the number of the load sides.

FIG. 5 shows that the power distribution panel is connected to the other power distribution panel in a vertical configuration by using the separate connectors 14; FIG. 6 shows that the power distribution panel whose input terminal is changed appropriately in position is connected to the other power distribution panel in a T-shaped configuration by using the separate connectors 14.

Although the present invention has been described for the case of 3-phase power source with reference to FIGS. 1 to 3, it is obvious that various combinations of configuration, in addition to the description with FIGS. 4 to 6, to implement the subject matter of the present invention are possible.

Therefore, the disclosed by the drawings are only the preferred embodiments to implement the power distribution panel according to the present invention.

It will be understood by those skilled in the art that various changes in form and details may be made therein without departing from the spirit and scope of the invention as defined by the appended claims.

The invention claimed is:

1. A power distribution panel, comprising:
    an input terminal including a tapped hole, a screw engaged with the tapped hole, and a washer, so as to connect with an incoming power line;
    a common line extending from the input terminal;
    a plurality of introduction lines furcating from the common line in parallel;
    connecting means including a plurality of output terminals which form end points of the introduction lines so as to connect with different load sides, such as a circuit breaker; and
    a terminal body including a central slot in which the common line is built; a plurality of side slots in which the respective introduction lines are built; an insulation block projectingly formed on the sides of the terminal body, so that it guides the introduction lines to the output terminals and insulates the respective introduction lines; and an identification block for identifying the output terminals of unit source out of the plurality of parallel-connected output terminals, the width of the identification block being different from that of the insulation blocks,
    whereby a plurality of loads are connected to an incoming power source.

2. The power distribution panel according to claim 1, wherein the respective output terminals of the connecting means, comprises a tapped hole, a screw engaged with the tapped hole, and a washer.

3. The power distribution panel according to claim 1, wherein the respective output terminals of the connecting means, comprises a socket in which a wire for load side is inserted, and a tightening member including a screw for tightening the wire inserted in the socket.

* * * * *